United States Patent
Ahmadvand et al.

(10) Patent No.: US 6,900,898 B2
(45) Date of Patent: May 31, 2005

(54) TEMPERATURE INSENSITIVE MACH-ZEHNDER INTERFEROMETERS AND DEVICES

(75) Inventors: Nima Ahmadvand, Ottawa (CA); Nadereh Mohtat, Ottawa (CA)

(73) Assignee: Peleton Photonic Systems, Inc., Ottawa (CA)

(*) Notice: Subject to any disclaimer, the term of this patent is extended or adjusted under 35 U.S.C. 154(b) by 0 days.

(21) Appl. No.: 10/886,553

(22) Filed: Jul. 9, 2004

(65) Prior Publication Data

US 2004/0252387 A1 Dec. 16, 2004

Related U.S. Application Data

(62) Division of application No. 09/920,050, filed on Aug. 2, 2001, now Pat. No. 6,778,278.

(30) Foreign Application Priority Data

| Aug. 3, 2000 | (CA) | 2314997 |
| Aug. 3, 2000 | (CA) | 2315006 |

(51) Int. Cl.$^7$ ............................................. G01B 9/02
(52) U.S. Cl. ........................................ 356/477; 385/12
(58) Field of Search ................................. 356/477, 478; 385/123, 12, 13; 250/227.19, 227.27

(56) References Cited

U.S. PATENT DOCUMENTS

| 5,311,279 A | * | 5/1994 | Wendler | 356/477 |
| 6,212,323 B1 | * | 4/2001 | Harpin et al. | 385/129 |
| 6,449,293 B1 | | 9/2002 | Pedersen et al. | 372/6 |
| 6,466,707 B1 | | 10/2002 | Dawes et al. | 385/14 |

* cited by examiner

Primary Examiner—Andrew H. Lee

(57) ABSTRACT

A Mach-Zehnder interferometer having two optical couplers interconnected by two optical fibers at least one of which is temperature insensitive. In use, temperature induced changes in the geometrical length and refractive index of the temperature insensitive fibers offset each other so that the optical path length of the fiber is unaffected by the temperature change. Where two temperature insensitive fibers are included these may be of the same or of different lengths. The interferometer may be used in a Dense Wavelength Division Multiplex system.

7 Claims, 4 Drawing Sheets

TEMPERATURE INSENSITIVE MACH-ZEHNDER INTERFEROMETERS AND DEVICES

CROSS-REFERENCE TO RELATED APPLICATION

This application is a divisional of application Ser. No. 09/920,050 filed Aug. 2, 2001, now U.S. Pat. No. 6,778,278.

BACKGROUND OF THE INVENTION

1. Field of the Invention

This invention relates generally to optical fiber devices and particularly to fiber based Mach-Zehnder interferometers (MZI), which are made insensitive to temperature changes and devices employing the same.

2. Prior Art of the Invention

Optical filters are frequently used in modern optical communication systems such as Dense Wavelength Division Multiplex (DWDM) systems. In these systems, a number of data channels share a single optical fiber as their transmission media and use a unique wavelength of light as their channel signature.

An optical waveguide MZI is composed of two optical splitters/couplers. Two lengths of optical waveguides or arms connect them to each other. When the arms of the MZI have different lengths, we have a so-called asymmetric Mach-Zehnder interferometer(AMZI). The optical waveguides referred to here are optical fibers with circular cross sections and/or planar optical waveguides with non-circular cross sections. A MZI made of optical fibers is called an all-fiber MZI.

Asymmetric MZIs show a periodic response as a function of wavelength. The period is a function of the length difference between the arms of the interferometer. As the length difference increases, the channel spacing decreases and, therefore, the wavelength selectivity increases. Asymmetric MZIs, once connected to each other as inter-leavers, can multiplex or de-multiplex a large number of optical signals of different wavelengths such as the standard ITU (International Telecommunications Union) grid wavelengths. An optical inter-leaver can separate the odd and even channels from a WDM signal consisting of several wavelengths.

One problem associated with fiber based AMZIs is their sensitivity to temperature, and the greater the length difference, the more severe is the problem. The problem originates mainly from a temperature-induced change in the optical path length of the fiber. As the temperature changes, the refractive index and the geometrical length of the fiber change. Consequently, a difference in the optical path lengths of two arms is created.

Several temperature compensation methods have been proposed to solve the temperature sensitivity of these photonic devices. However, most of these methods work within a limited range of temperatures and cannot be applied easily to the asymmetric MZI cases where large differences in the optical paths exist. Active temperature compensation of photonic devices is typically carried out by maintaining the temperature of the fibers' environment above a chosen temperature (e.g., above 60° C.). This is achieved by including a heater controller inside the package of the device. However, the high power demands of the active temperature compensation and its low reliability have made the search for passive methods an on-going effort within the photonic industry.

Temperature insensitive fibers can be built by a method that, for example, has been disclosed in the U.S. Pat. No. 5,018,827. In the named patent, an insensitive optical fiber is produced when an optical fiber core made of a first material is enclosed within a cladding made of a second material having a different coefficient of thermal expansion.

In a recent U.S. Pat. No. 6,081,641, a passive temperature compensating method is presented for a fused-fiber DWDM system. In this invention, two dissimilar materials with different thermal expansion coefficients are used to construct a fixture containing the DWDM device. By using this structure, it is possible to artificially create a negative coefficient of thermal expansion. The DWDM device is typically assembled on a pre-stressed fixture. However, the device can also be built under tension and then assembled on the relaxed bi-substrate fixture. In the former design, the whole assembly can exert tension on, or release tension from, the fiber. Temperature compensation is then established by adjusting the applied tension on the fused-fiber DWDM. It is shown that, as tension is relieved, the thermal drift due to an increase in temperature is compensated. Conversely, by increasing tension, wavelength shifts due to a decrease in temperature are compensated. By using such a temperature-compensating device, a bulky package is inevitable. In addition, dimensional design and choice of material can be demanding requirements.

An object of this invention is to provide a novel temperature insensitive asymmetric fiber based MZI.

SUMMARY OF THE INVENTION

Optical filters with sharp wavelength characteristics are vital components of WDM technology. Interferometer devices, and in particular fiber based interferometer devices such as the MZI, show useful filtering characteristics, are easily expandable, and exhibit low insertion loss. A fiber based optical MZI consists of two optical couplers or splitters with predetermined coupling or splitting ratios connected together through two lengths of optical fiber. In order to decrease the channel spacing between two adjacent channels of an interleaver response, the length difference ($\Delta l$) between the two arms should increase. As a result, the optical path length difference also increases, generating a higher sensitivity within the MZI to fluctuations in its temperature.

The challenge lies in correctly achieving the desired channel spacing. This is accomplished by measuring the correct $\Delta l$ between the two arms connecting the two couplers of the MZI. As a result of the different optical paths between the two arms of the two couplers, a sinusoidal wavelength response can be obtained with low polarization dependence and low insertion loss. Using a precision reflectometer or an optical spectrum analyzer, the difference between the two arms of the MZI can be measured to within $\pm 10$ $\mu$m.

The object of this invention is consistent of two parts. In one part, a temperature insensitive MZI may be made using a specialty fiber as disclosed in U.S. Pat. No. 5,018,827. An insensitive optical fiber can be tailored such that temperature-induced changes in its geometrical length and in its refractive index offset each other in such a fashion that the optical path length is, for all intents and purposes, independent of temperature. By carefully choosing two different glasses for the core and cladding, and by appropriately adjusting their radii, the observed center wavelength shift sensitivity of the MZI filter due to temperature variations can be eliminated. It is noted this specialty fiber that may contain different dopant concentrations from that in the regular single mode fiber can be fusion spliced to a regular fiber with minimum loss. In the second part of this invention, a layer of a properly selected material is deposited onto a small section of one arm or both arms of the MZI to compensate for the temperature-induced variations.

BRIEF DESCRIPTION OF THE DRAWINGS

The preferred exemplary embodiments of the present invention will now be described in detail in conjunction with the annexed drawing, in which.

DETAILED DESCRIPTION OF THE PREFERRED EMBODIMENTS

Figure 1:
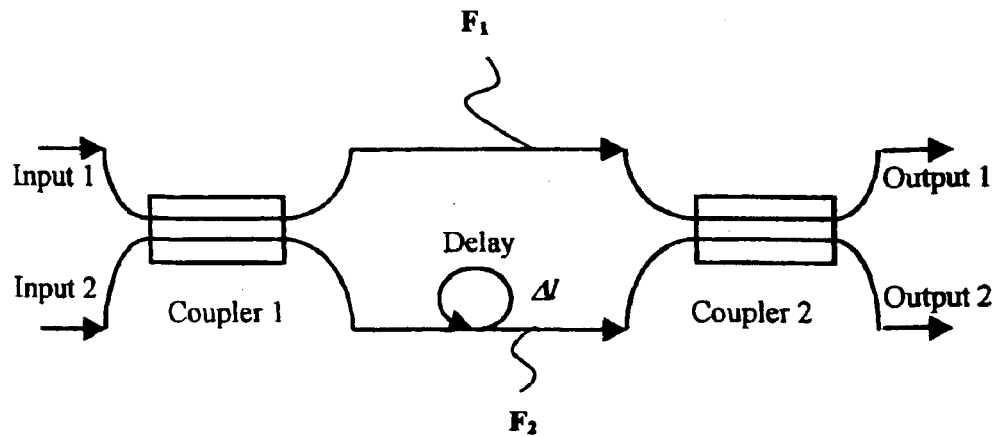
FIG. 1 shows general structure of a prior art asymmetric Mach-Zehnder Interferometer (MZI)
Figure 2:
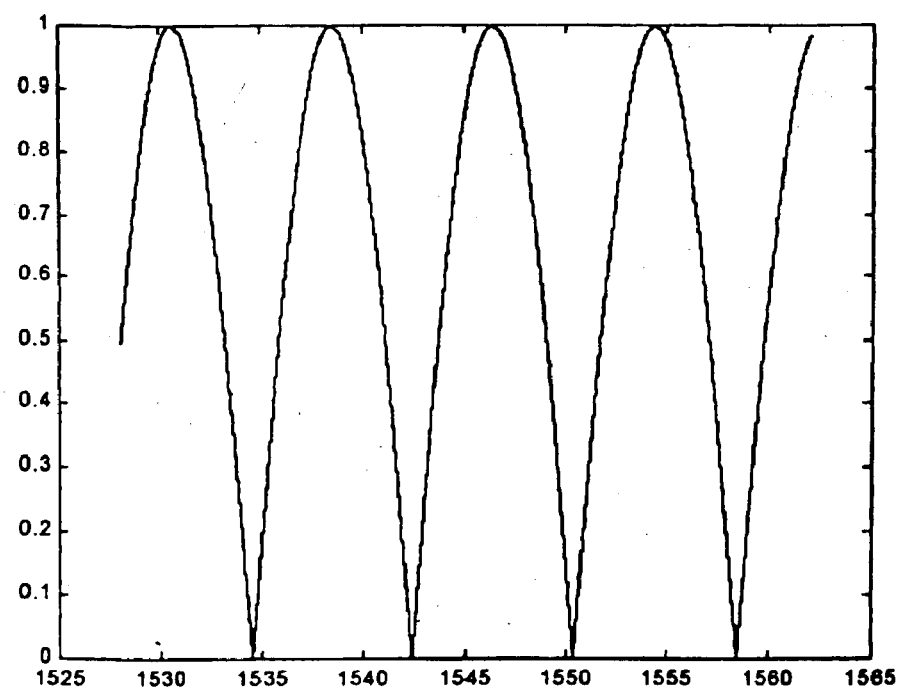
FIG. 2 illustrates the transfer function of the asymmetric MZI periodic filter of FIG. 1.
Figure 3:
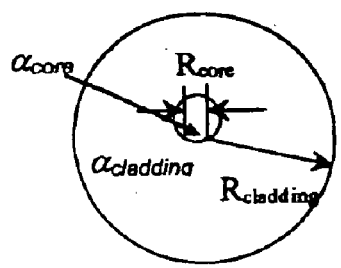
FIG. 3 shows a typical single optical fiber cross-section as used in the MZI of FIG. 1.

Referring to FIG. 1, it depicts a prior art AMZI with couplers 1 and 2 interconnected by two optical fibers F1 and F2, F2 being slightly longer than F1 to provide an additional differential delay ΔL, thus providing an asymmetric MZI (and periodic filter) without temperature compensation. The AMZI is, therefore, sensitive in its filtering transfer function, shown generally in FIG. 2, to variations in ambient temperature. The fibers F1 and F2 have a cross-section as shown in FIG. 3 with a core of radius $R_{core}$ and a cladding of radius $R_{cladding}$, the Coefficient of Thermal Expansion (CTE) being $x_{core}$ and $x_{cladding}$, respectively.

Figure 4:
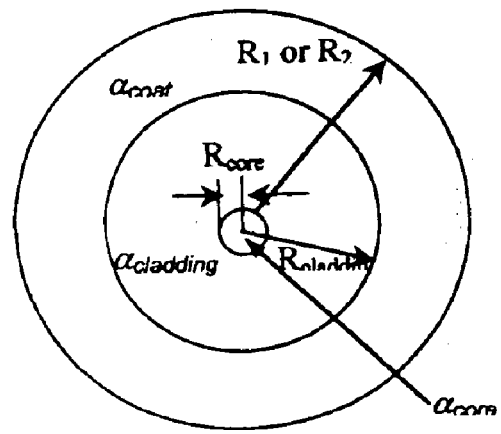
FIGS. 4 and 5 show in cross-section and perspective the temperature compensating deposited coating layer onto the fiber according to the present invention.

In FIG. 4 is shown a cross-section of a temperature compensated fiber having a long part of its length a surrounding coating of, generally, radius $R_1$ and $R_2$ and a CTE $x_{coat}$. Such fiber section is shown in perspective FIG. 5 and, generally, two such section $l_1$ and $l_2$ as shown in FIG. 6, are inserted as portions of the uncompensated fibers $F_1$ and $F_2$, thus providing a temperature compensated (insensitive) AMZI, having a stable transfer function as shown in FIG. 2.

Figure 6:
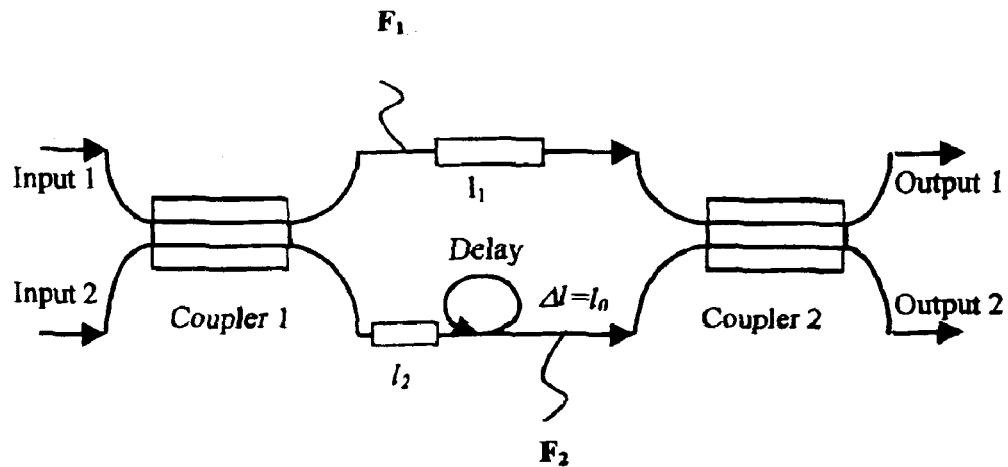
FIG. 6 show the general structure of an asymmetric MZI incorporating the temperature compensated fiber of the FIGS. 4 and 5.
Figure 7:
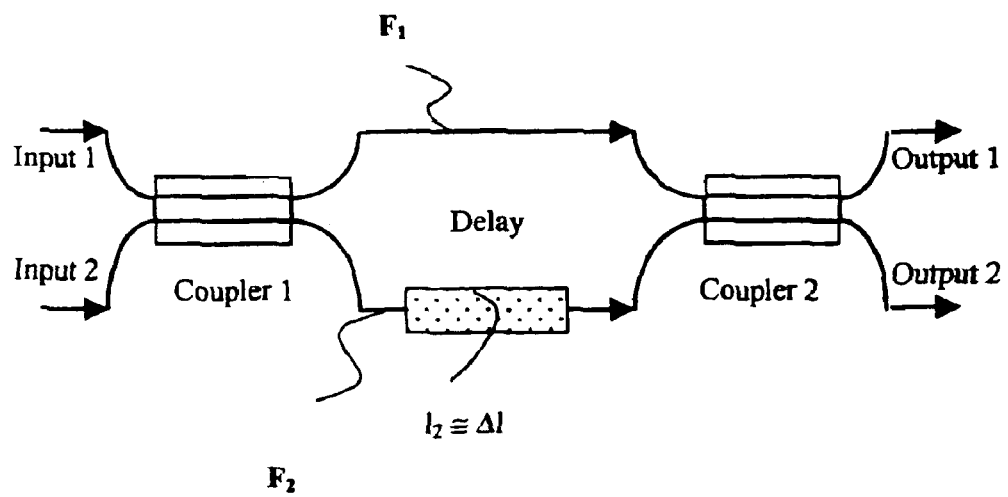
FIG. 7 shows the AMZI of FIG. 6 but with the temperature compensated fiber in only one arm.

An alternative embodiment of FIG. 6 is shown in FIG. 7, where only the fiber arm $F_2$ has inserted therein a temperature compensated section $l_2$, which also of sufficient length to provide the requisite delay ΔL.

FIGS. 6 and 7 thus depicts the novel temperature insensitive Mach-Zehnder Interferometer (MZI). This structure could be used in many other optical systems that use an MZI. This is particularly significant in Dense Wavelength Division Multiplexing (DWDM) subsystems such as optical interleavers, multiplexer/demultiplexers and filters which are based on MZIs.

An AMZI consists of two optical 3-dB (50:50) couplers interconnected with two fiber arms having different optical path lengths, one arm being longer than the other by ΔL. Once the temperature changes, the lengths of the optical paths of the two arms also change. Since the two arms do not have the same length, one arm experiences more changes than the other. It should be noted, however, that the temperature dependency is not only due to the geometric path length expansion or contraction but also due to the change in the refraction index of the fiber. The aim is to compensate for both effects and consequently the changes caused by temperature variations.

Referring to FIG. 3, the fiber core radius is indicated by $R_{core}$ the cladding radius by $R_{cladding}$. The Coefficient of Thermal Expansion (CTE) of the core material is $\alpha_{core}$ and that of the cladding material is $\alpha_{cladding}$. The effective CTE of the optical fiber is $$\alpha_{fiber}=(\alpha_{core}A_{core}+\alpha_{cladding}A_{cladding})/(A_{core}+A_{cladding}), \quad \text{Eq. 1}$$

where $A_{core}$ and $A_{cladding}$ are the cross-sectional areas of the core and cladding, respectively. The above formula is simply a weighted average of the two coefficients of thermal expansion. Replacing $A_{core}$ by $\pi R_{core}^2$ and $A_{cladding}$ by $\pi(R_{cladding}^2 - R_{core}^2)$ we obtain $$\alpha_{fiber}=(R_{core}/R_{cladding})^2(\alpha_{core}-\alpha_{cladding})+\alpha_{cladding}. \quad \text{Eq. 2}$$

The optical path $L_{opt}$ of an optical fiber of geometric length $L_{geo}$ and refractive index n is $$L_{opt}=nL_{geo}. \quad \text{Eq. 3}$$

Consequently, the change of the refractive index or geometric length can affect the optical path length as follows.

$$\Delta L_{Opt}=\Delta n \cdot L_{geo}+n \cdot \Delta L_{geo} \quad \text{Eq. 4}$$

In this equation, Δn is the thermal change in the refractive index for a temperature change of ΔT degrees, which is equal to (dn/dT)ΔT. Similarly, $\Delta L_{geo}$ indicates the thermal expansion or contraction of the geometric length of the fiber for ΔT, i.e. $\Delta L_{geo}=(dL_{geo}/dT)\Delta T$. Replacing them in the above equation, we can get $$\Delta L_{Opt}=[L_{geo}(dn/dT)+n(dL_{geo}/dT)]\Delta T \quad \text{Eq. 5}$$

We also know that in the linear region of the thermal expansion of the geometric length of the fiber $dL_{geo}/dT=\alpha_{fiber}L_{geo}$. Therefore, $$\Delta L_{Opt}=[(dn/dT)+n\alpha_{fiber}]L_{geo}\Delta T. \quad \text{Eq. 6}$$

From the above equation, if $(dn/dT)+n\alpha_{fiber}=0$, or $(dn/dT)=-n\alpha_{fiber}$, then $L_{opt}=0$, i.e. optical path length does not change with temperature. The typical values for $\alpha_{fiber}$ are in the range of $10^{-7}$ (° C.$^{-1}$), while typical values for dn/dT are usually in the range of $10^{-6}$ (° C.$^{-1}$). Therefore, there is a chance to select some of the parameters of the fiber, such as the core or cladding radii, core or cladding material, and so on, to provide a temperature insensitive fiber. The present invention, however, provides a simpler method to compensate the temperature sensitivity of the asymmetric MZI.

According to the present invention, a layer or coating of a selected material is deposited onto a small portion along the length of the optical fiber constituting one arm or both arms of the MZI. There are a number of advantages to this method; some of them are discussed here. This method eliminates the complexity of specialty fiber manufacturing needed for a temperature insensitive fiber. Secondly, the deposited material can be selected from a wider range of materials by varying the thickness of the deposited layer. Such method is not as complicated as the fabrication of a specialty temperature insensitive fiber. Finally, the method can be easily adapted to different fiber types.

Figure 5:
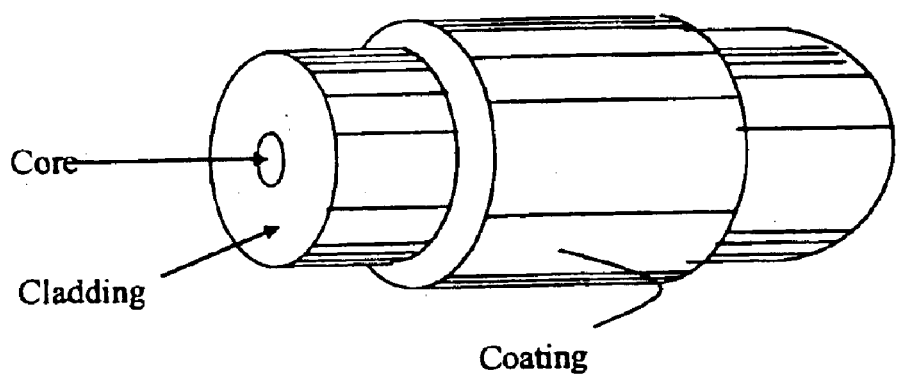

As shown in FIGS. 4, 5 and 6, the general case is where a layer of a properly selected material is deposited as coating onto each arm of the MZI. For the shorter arm, the length of the coating region is shown by $l_1$, the radius of the resulting cross-sectional radius and area by $R_1$ and $A_1$, respectively. Similarly, $l_2$, $R_2$ and $A_2$ show the length, resulting cross-sectional radius and area for the longer arm. The CTE for the coating material on the shorter arm is $\alpha_{coat(1)}$ and $\alpha_{coat(2)}$ for the longer arm. The effective CTE for these regions can be calculated by $$\alpha_i = (\alpha_{core}A_{core} + \alpha_{cladding}A_{cladding} + \alpha_{coat(i)}A_i)/(A_{core} + A_{cladding} + A_i), \quad \text{Eq. 7}$$

where i=1,2. In the above equation, $\alpha_1$ and $\alpha_2$ are the effective CTE for the coated region of the shorter and longer arm, respectively. Again replacing the cross-sectional areas we get to $$\alpha_i = (R_{core}/R_i)^2(\alpha_{core} - \alpha_{cladding}) + (R_{cladding}/R_i)^2(\alpha_{cladding} - \alpha_{coat(i)}) + \alpha_{coat(i)}, \quad \text{Eq. 8}$$

and i=1,2.

Now assume the geometric length of the shorter arm of the MZI to be $L_{g1}$, and the longer arm to be $L_{g2} = L_{g1} + l_0$. As discussed before, in order to compensate for the temperature changes the following condition must satisfy.

$$\Delta L_{1Opt} = \Delta L_{2Opt} \quad \text{Eq. 9}$$

Replacing each side for a $\Delta T$ temperature change, we find $$(dn/dt + n\alpha_{fiber})(L_{g1} - l_1)\Delta T + (dn/dT + n\alpha_1)l_1\Delta T = (dn/dT + n\alpha_{fiber})(L_{g1} + l_0 - l_2)\Delta T + (dn/dt + n\alpha_2)l_2 \quad \text{Eq. 10}$$

If we rearrange and simplify the equation, we can write it as $$(\alpha_1 - \alpha_{fiber})nl_1 = (\alpha_2 - \alpha_{fiber})nl_2 + (dn/dT + n\alpha_{fiber})l_0 \quad \text{Eq. 11}$$

If we assume the coating length is on one of the arms, the above equation gives the coating length on the other arm of the MZI. For the simplest case, we deposit on only one arm. In that case, we set the length of the coating region on one of the arms to zero.

If the coating section is on the shorter arm, then $$l_2 = 0, \; l_1 = \frac{\left(\frac{dn}{dT} + n\alpha_{fiber}\right)l_0}{n(\alpha_1 - \alpha_{fiber})} \quad \text{Eq. 12-1}$$

If the coating section is on the longer arm, then $$l_1 = 0, \; l_2 = \frac{-\left(\frac{dn}{dT} + n\alpha_{fiber}\right)l_0}{n(\alpha_2 - \alpha_{fiber})} \quad \text{Eq. 12-2}$$

It should be noted that usually dn/dT is positive and greater in absolute value than $n\alpha_{fiber}$. As a result the nominator value in Eq. 12-2 is negative. In this case, Eq. 12-1 gives $\alpha_{fiber} = \alpha_{core} = 5.6 \times 10^{-7}$ (/° C.)
$\alpha_{coat(1)} = 2 \times 10^{-6}$ (/° C.)
$R_{core} = 8$ micrometer
$R_{cladding} = 125$ micrometer
$R_2 = (125 + 50) = 175$ micrometer
$\alpha_2 = 1.27 \times 10^{-6}$ (/° C.)
$l_2 = 13.16$ mm
$l_2 = 0$ If we increase the thickness of the coating layer to 0.1 mm (100 micrometer), 0.5 mm (500 micrometer), and 1 mm (1000 micrometer), we obtain the following results.

| | |
|---|---|
| Coating thickness 0.1 mm | $R_2 = (125 + 100) = 225$ micrometer <br> $\alpha_1 = 1.56 \times 1^{-6}$ (/° C.) <br> $l_1 = 9.32$ mm |
| Coating thickness 0.5 mm | $R_2 = (125 + 500) = 625$ micrometer <br> $\alpha_1 = 1.94 \times 10^{-6}$ (/° C.) <br> $l_1 = 6.72$ mm |
| Coating thickness 1 mm | $R_2 = (125 + 1000) = 1125$ micrometer <br> $\alpha_1 = 1.98 \times 10^{-6}$ (/° C.) <br> $l_1 = 6.53$ mm |

Figure 8:
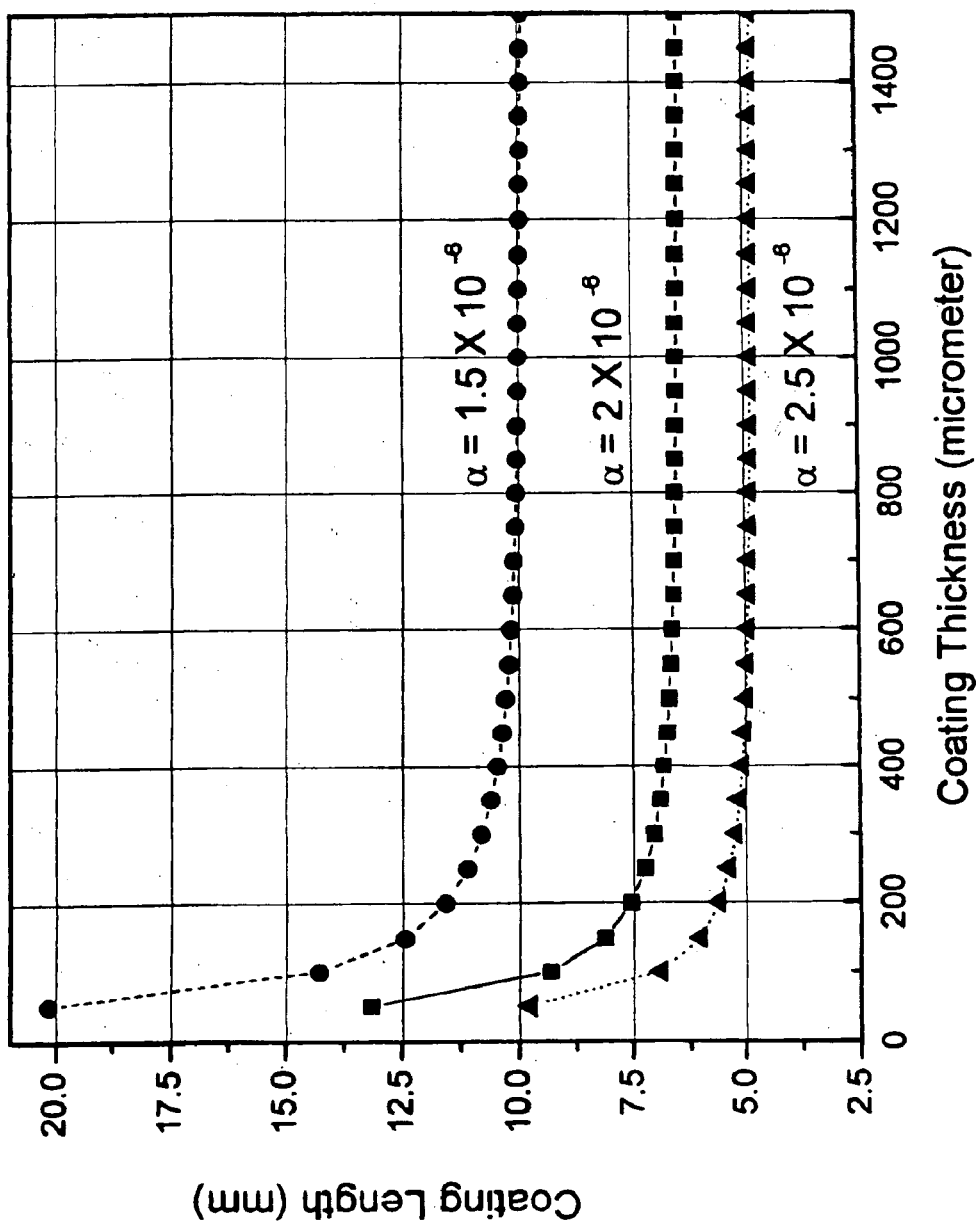
FIG. 8 displays the length of the coated section vs. coating thickness for the preferred examples.

In FIG. 8, $l_2$ values for different coating thicknesses are plotted for the above parameters for an Invar alloy ($\alpha = 2 \times 10^{-6}$ (° C.)$^{-1}$). We see that for thick layers of coating, the length of the coating region gets to a limit, which is around 4.9 mm for the above example.

Similar calculations can be carried out to find thickness and length of the coating section for the case of the deposition on the shorter arm of the MZI. It is apparent that a combination of depositions on both arms can also be done. In this case, the length of coating on one of the arms depends on the other one. As a result, one of the lengths (i.e. $l_1$ or $l_2$) is the free parameter.

In one embodiment where an insensitive fiber is used instead of a coated fiber, the two arms of the two couplers are cut into equal lengths and are fusion spliced to two insensitive optical fibers with a predetermined $\Delta l$. By cutting the two insensitive fibers to different lengths, an optical path length difference is produced. Using a fiber cleaving stage equipped with a micro-positional fixture it is possible to make a precise $\Delta l$ between the two arms of an MZI. Polishing the fiber to obtain the desired channel spacing before the arms are spliced to form the MZI achieves the final length adjustment In another embodiment, the two arms of one coupler are cut as close in length to each other as possible and are spliced to two arbitrary lengths of the insensitive fiber. The new coupler formed is then cut to the desired $\Delta l$ and fused to the two equal arms of the other coupler.

Another embodiment of a fiber based insensitive asymmetric MZI is made of two couplers in which the insensitive fiber is used only in one of the arms of the MZI. The length of the insensitive fiber, in this case precisely equals the predetermined $\Delta l$. The other arm of MZI made of conventional single mode silica fiber will then be fusion spliced together to form the MZI.

By forming an insensitive MZI, a complex bimetallic packaging structure for passive temperature compensation is not needed, nor is an active method necessary. The use of expensive composite materials in the packaging of the device is eliminated as well. An insensitive MZI of this invention can be easily made to any desired $\Delta l$. The novel design of this invention easily provides higher $\Delta l$ and thus higher channel number without the problem of temperature sensitivity due to different-optical path lengths.

What is claimed is:

1. A Mach-Zehnder interferometer comprising two optical couplers intercommunicated together by two optical fibers at least one of which is a temperature insensitive fiber in which temperature induced changes in the geometrical length and refractive index of the temperature insensitive fiber offset each other whereby the optical path length of the temperature insensitive fiber is unaffected by change in temperature.

2. A Mach-Zehnder interferometer according to claim 1 wherein each of the two optical fibers is a temperature insensitive fiber.

3. A Mach-Zehnder interferometer according to claim 2 wherein the two optical fibers are of different length.

4. A Mach-Zehnder interferometer according to claim 3 wherein each optical coupler has arms of substantially equal length and with each arm connected to an individual one of the two optical fibers.

5. A Dense Wavelength Division Multiplex system comprising a Mach-Zehnder interferometer comprising two optical couplers intercommunicated together by two optical fibers at lest one of which is temperature insensitive fiber in which temperature induced changes in the geometrical length and refractive index of the temperature insensitive fiber offset each other whereby the optical path length of the temperature insensitive fiber is unaffected by change in temperature.

6. A Mach-Zehnder interferometer according to claim 1 wherein the temperature insensitive fiber is shorter than the other fiber.

7. A Mach-Zehnder interferometer according to claim 1 wherein the temperature insensitive fiber is longer than the other fiber.

* * * * *